United States Patent
Yoshino et al.

(10) Patent No.: US 8,230,828 B2
(45) Date of Patent: Jul. 31, 2012

(54) ENGINE BLOWER

(75) Inventors: Junichi Yoshino, Kawagoe (JP); Satoshi Nakazawa, Kawagoe (JP); Satoshi Miyashita, Kawagoe (JP)

(73) Assignee: Husqvarna Zenoah Co Ltd., Kawagoe-Shi (JP)

( * ) Notice: Subject to any disclaimer, the term of this patent is extended or adjusted under 35 U.S.C. 154(b) by 684 days.

(21) Appl. No.: 12/373,509

(22) PCT Filed: Jul. 12, 2007

(86) PCT No.: PCT/JP2007/063885
§ 371 (c)(1),
(2), (4) Date: Jan. 12, 2009

(87) PCT Pub. No.: WO2008/007727
PCT Pub. Date: Jan. 17, 2008

(65) Prior Publication Data
US 2009/0290999 A1 Nov. 26, 2009

(30) Foreign Application Priority Data

Jul. 12, 2006 (JP) ................... 2006-191343

(51) Int. Cl.
*F02B 25/00* (2006.01)
*F02B 67/00* (2006.01)

(52) U.S. Cl. .................. 123/65 BA; 123/195 E; 15/405

(58) Field of Classification Search ............... 123/195 E, 123/65 BA
See application file for complete search history.

(56) References Cited

U.S. PATENT DOCUMENTS

| 3,672,344 | A | * | 6/1972 | Albertson | 123/198 DB |
| 4,799,287 | A | * | 1/1989 | Belanger et al. | 15/405 |
| 6,552,891 | B1 | | 4/2003 | Prach | |
| 7,279,021 | B2 | | 10/2007 | Haberlein | |
| 2005/0039298 | A1 | | 2/2005 | Joos | |
| 2005/0166882 | A1 | | 8/2005 | Suzuki et al. | |
| 2005/0229556 | A1 | | 10/2005 | Haberlein | |

FOREIGN PATENT DOCUMENTS

| CN | 1663340 A | 9/2005 |
| JP | 56-76058 U | 6/1981 |
| JP | 61-45898 Y2 | 12/1986 |

(Continued)

OTHER PUBLICATIONS

International Preliminary Report on Patentability and Written Opinion dated Jan. 20, 2009, issued in connection with International Application Serial No. PCT/JP2007/063885.
English Language International Search Report dated Sep. 11, 2007 issued in parent Appln. No. PCT/JP2007/063885.
Chinese Office Action dated May 25, 2010 and English translation thereof, issued in counterpart Chinese Application No. 200780025421.8.
Extended European Search Report dated Jun. 29, 2010 in English, issued in counterpart European Application No. 07790679.0.

*Primary Examiner* — Noah Kamen
*Assistant Examiner* — Grant Moubry
(74) *Attorney, Agent, or Firm* — Holtz, Holtz, Goodman & Chick, PC

(57) ABSTRACT

An engine blower includes a centrifugal blower having a volute case in which a fan is accommodated; an engine attached to the centrifugal blower for driving the fan; a carburetor mounted to the engine via an insulator; and a lead wire that establishes conduction between the engine and the carburetor. The electrical potential difference between the engine and the carburetor can be eliminated, which prevents electrostatic discharge between the engine and the carburetor even when static electricity is built up in a volute case or a ventilation tube. Accordingly, ignition timing can be prevented from shifting due to an influence on an electrical circuit by the discharge within an ignition unit.

2 Claims, 5 Drawing Sheets

FOREIGN PATENT DOCUMENTS

| JP | 3-124496 U | 12/1991 |
| JP | 7-5299 U | 1/1995 |
| JP | 2000-234571 A | 8/2000 |
| JP | 2001-073793 A | 3/2001 |

* cited by examiner

ENGINE BLOWER

This application is a U.S. National Phase Application under 35 USC 371 of International Application PCT/JP2007/063885 filed Jul. 12, 2007.

TECHNICAL FIELD

The present invention relates to an engine blower, and more particularly to an engine blower for which a countermeasure against static electricity is taken.

BACKGROUND ART

A conventional engine blower includes a centrifugal blower having a volute case in which a fan is accommodated, an engine for driving the fan to rotate, and a ventilation tube attached to the centrifugal blower for ejecting jet-air generated by the rotation of the fan. The centrifugal blower, the ventilation tube and the like are made of synthetic resin.

In addition, a carburetor is mounted to the engine via a synthetic-resin insulator. The insulator is attached to the engine by a screw inserted from the insulator. The carburetor is attached to the insulator by screwing a screw inserted from the carburetor into a nut provided on the insulator.

Such an engine blower sucks in dust or the like flying up when cleaning fallen leaves. Accordingly, when jet-air is ejected by the engine blower, the dust is rubbed against the synthetic-resin volute case and ventilation tube to generate static electricity. When a predetermined amount of static electricity is built tip in the volute case and ventilation tube, the built-up static electricity is sometimes discharged to the nut provided on the insulator for attaching the carburetor from the screw for attaching the insulator to the engine through the engine having conductivity. Due to this electrostatic discharge, an ignition unit disposed adjacent to the insulator may be affected, which may cause ignition timing to unfavorably shift.

In order to solve such a problem, a grounding chain is hung from the volute case and dropped to a ground so that static electricity built up in the volute case can be transferred to the ground (for example, Patent Document 1).

[Patent Document 1] JP-UM-B-61-45898

DISCLOSURE OF THE INVENTION

Problems to Be Solved by the Invention

However, when employing the grounding chain as disclosed in Patent Document 1, it is required to ensure that the grounding chain is not entangled with operator's feet, which makes operation troublesome. Thus, it has been desired to prevent electrostatic discharge without using a grounding chain.

An object of the invention is to provide an engine blower capable of preventing electrical discharge between an engine and a carburetor without using a grounding chain.

Means for Solving the Problems

An engine blower according to an aspect of the invention includes: a centrifugal blower including a volute case in which a fan is accommodated; an engine attached to the centrifugal blower for driving the fan; a carburetor mounted to the engine via an insulator; and a lead wire that establishes conduction between the engine and the carburetor.

According to the aspect of the invention, the engine is conductively connected with the carburetor via the lead wire. Thus, electrical potential difference between the engine and the carburetor can be eliminated, and electrostatic discharge therebetween can be prevented. Consequently, ignition timing can be prevented from shifting due to influence on an ignition unit by the discharge in the vicinity of the insulator.

The engine blower according to the aspect of the invention further includes: a throttle cable, a first end of which is connected to a throttle lever of the carburetor while a second end of which is connected to an accelerator lever for an operator's operation, the throttle cable adjusting a valve opening degree of the carburetor. An inner wire within the throttle cable is in conduction with the lead wire.

According to the aspect of the invention, since the first end of the lead wire is connected to the engine and the second end of the lead wire is connected to the inner wire within the throttle cable connected to the accelerator lever for an operator's operation, the engine can be grounded via the lead wire, inner wire, accelerator lever and operator. Thus, static electricity built up in the engine can be transferred to the ground, which reliably prevents electrostatic discharge between the engine and the carburetor.

BEST MODE FOR CARRYING OUT THE INVENTION

An exemplary embodiment of the invention will be described below with reference to the accompanying drawings.

Figure 1:
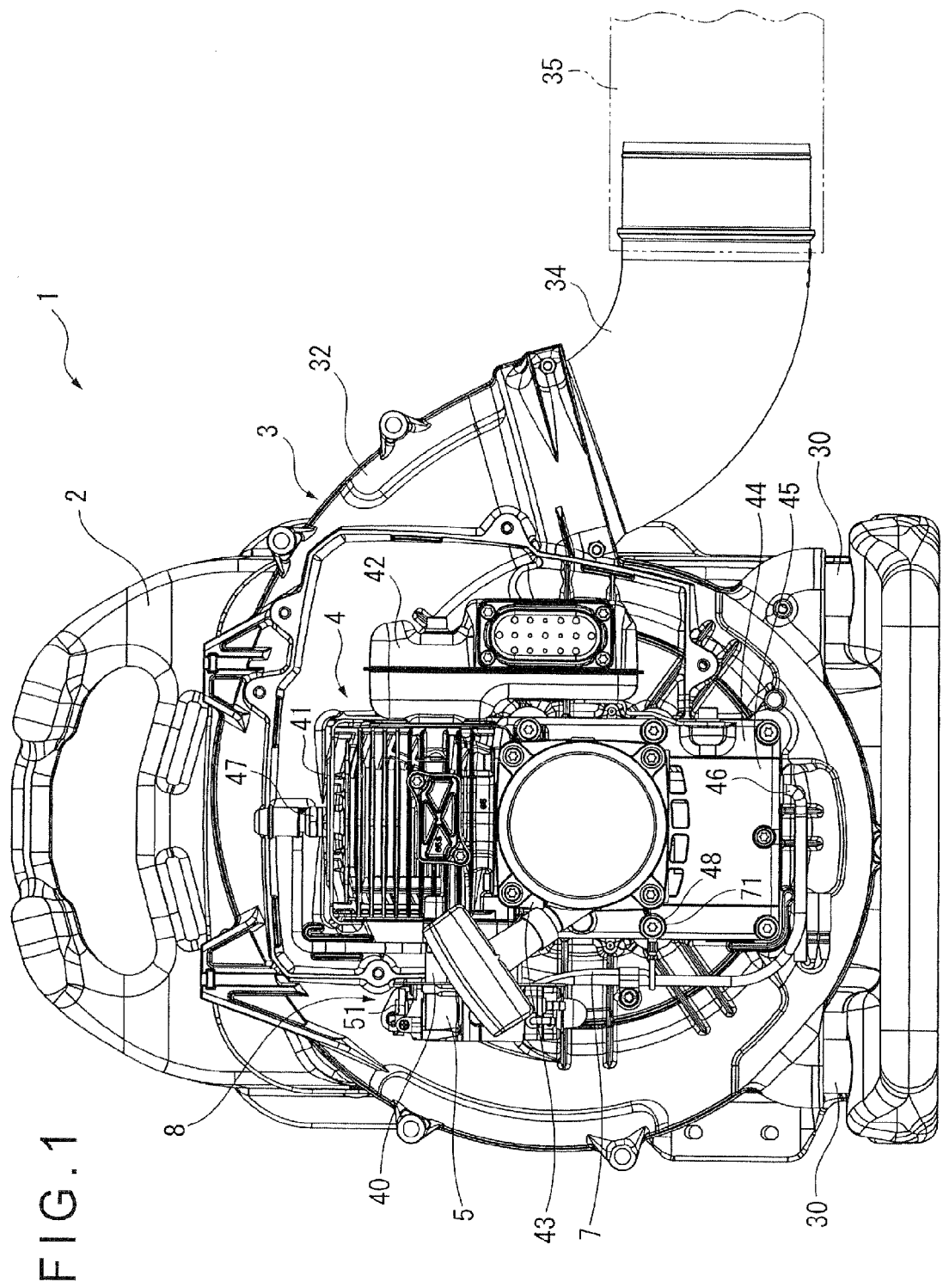
FIG. 1 is a front elevation showing an engine blower according to an exemplary embodiment of the invention.
Figure 2:
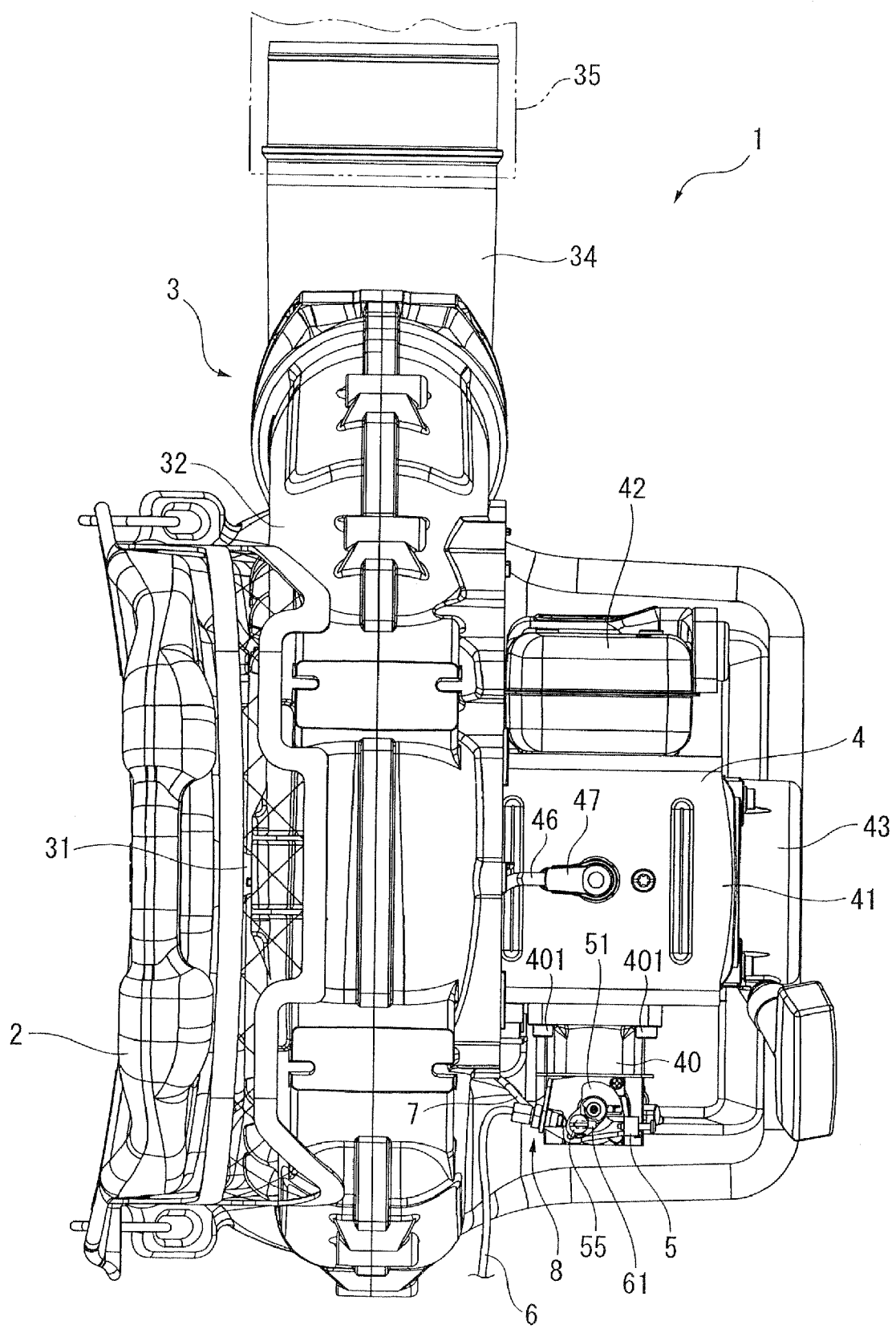
FIG. 2 is a plan view of the engine blower.

FIG. 1 is a front elevation showing an engine blower 1 according to the exemplary embodiment. FIG. 2 is a plan view showing the engine blower 1 and FIG. 3 is a perspective view showing a primary part of the engine blower 1.

The engine blower 1, which is a back-pack type, includes: a frame 2 that is L-shaped as viewed from a lateral side thereof: a centrifugal blower 3 supported by a rubber mount 30 on a bottom surface of the frame 2 and supported by another rubber mount 31 (see FIG. 2) on a back surface thereof: an engine 4 accommodated in a volute case 32 forming the centrifugal blower 3 for driving and rotating a centrifugal fan (not shown): and a ventilation tube 35 mounted to an elbow 34 of the centrifugal blower 3 for ejecting jet-air caused by the rotation of the fan. In the engine blower 1, primary parts such as the centrifugal blower 3 and the ventilation tube 35, except for the engine 4, are made of synthetic resin.

The engine 4 may be a stratified scavenging two-stroke engine. A carburetor 5 is mounted to the engine 4 via an insulator 40 while a muffler 42 is mounted to the engine 4 to interpose a cylinder 41 between the muffler 42 and the carburetor 5. The engine 4 is mounted to the centrifugal blower 3 by screwing a crankcase attachment 44 integrated with a crankcase 43.

Figure 3:
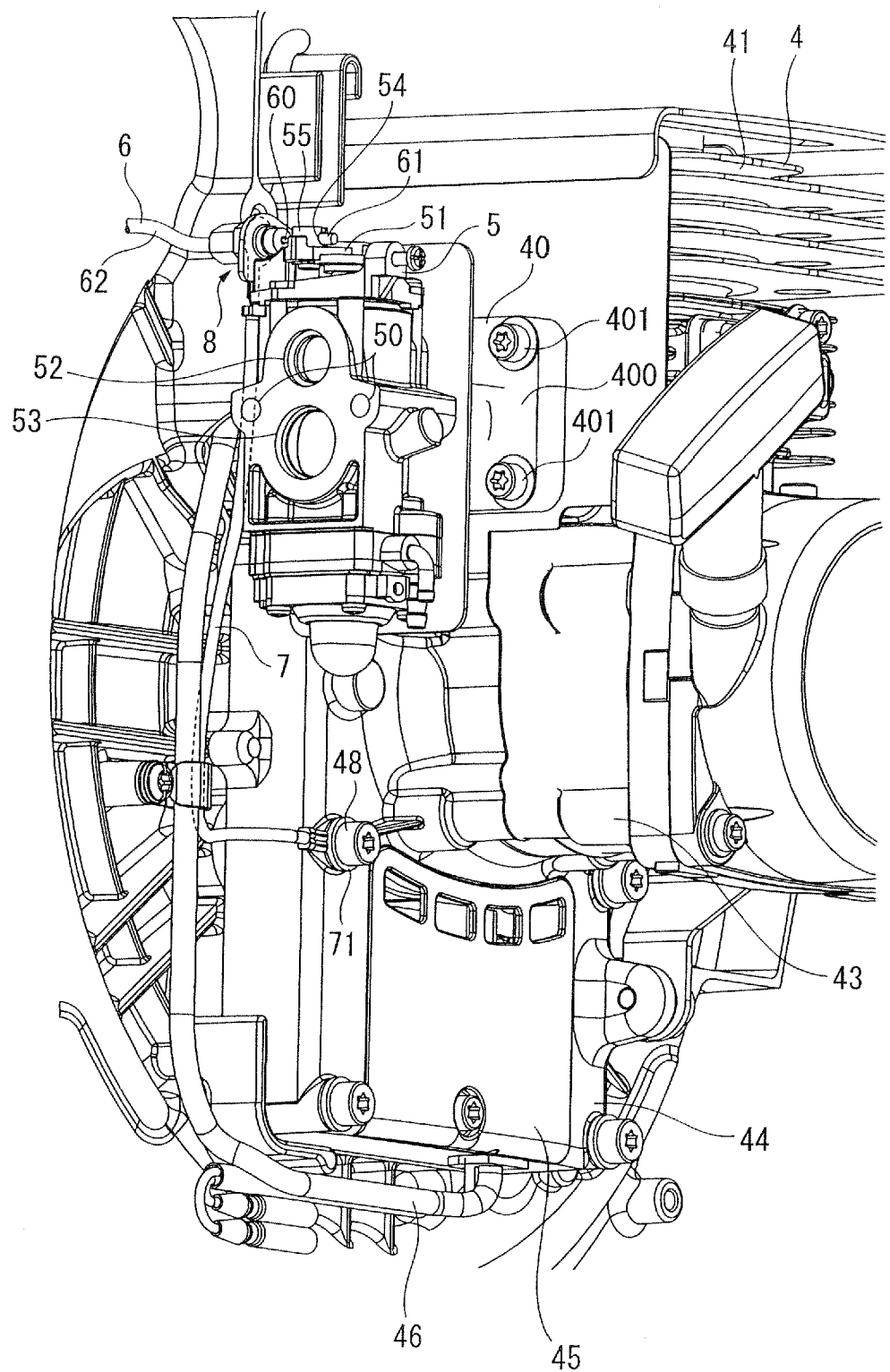
FIG. 3 is a perspective view showing a primary part of the engine blower.

As shown in FIG. 3, the insulator 40 is mounted to the engine 40 by a screw 401 penetrating a flat-plate shaped base 400. Also, the insulator 40 is provided with a nut (not shown) for attaching the carburetor. The nut is disposed on a position adjacently opposed to the screw 401.

The carburetor 5 is fixed to the insulator 40 by inserting a screw (not shown) from a screw hole 50 into the nut provided on the insulator 40 for attaching the carburetor. A rotary valve is rotatably provided within the carburetor 5. The rotary valve changes a valve opening degree in a leading air passage 52 and a mixture passage 53 by using a throttle lever 51 provided on an upper portion of the carburetor 5 (on the upper side in FIG. 3), thereby adjusting an amount of leading air and mixture to be fed to the cylinder 41.

The throttle lever 51 is provided with a connecting pin 55 having an aperture 54. A stopper 61 (see FIG. 4) provided on one end of an inner wire 60 in a throttle cable 6 is inserted into the aperture 54. The other end of the throttle cable 6 is connected to an accelerator lever (not shown) for an operator's operation. In other words, the carburetor 5 is connected to the accelerator lever via the throttle cable 6 (inner wire 60).

An ignition-unit accommodating section 45 is provided in a lower portion of the crankcase attachment 44 (on the lower side in FIG. 3). The ignition-unit accommodating section 45 houses an ignition unit including a power-generating coil, an ignition coil and a capacitor therein. The ignition unit applies voltage to a spark plug 47 via an ignition code 46.

In the engine blower 1 of this exemplary embodiment, the engine 4 is conductively connected with the inner wire 60 whose one end of the inner wire 60 is connected to the carburetor 5 via a lead wire 7. Specifically, as shown in FIG. 3, a first end of the lead wire 7 is attached to the crankcase attachment 44 and a second end of the lead wire 7 is attached to a throttle adjuster 8 provided adjacent to the throttle lever 51. In the throttle adjuster 8, the second end of the lead wire 7 is conductively connected with the inner wire 60 provided within the throttle cable 6.

More specifically, solderless terminals 71 and 72 (see FIG. 4) are provided on both ends of the lead wire 7. The solderless terminal 71 on the first end of the lead wire 7 is attached to the crankcase attachment 44 by a screw 48.

Figure 4:
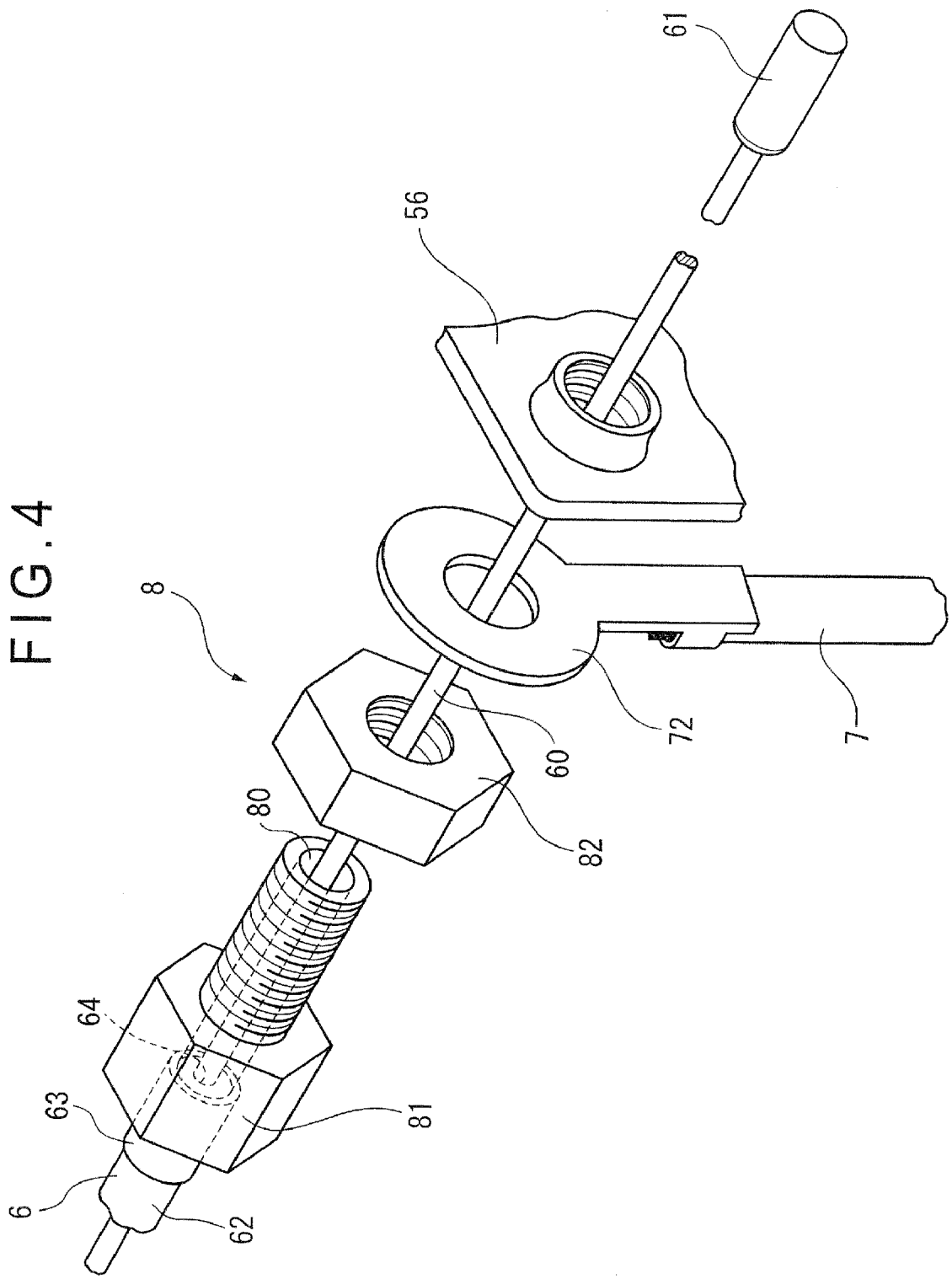
FIG. 4 is an exploded perspective view of a throttle adjuster.
Figure 5:
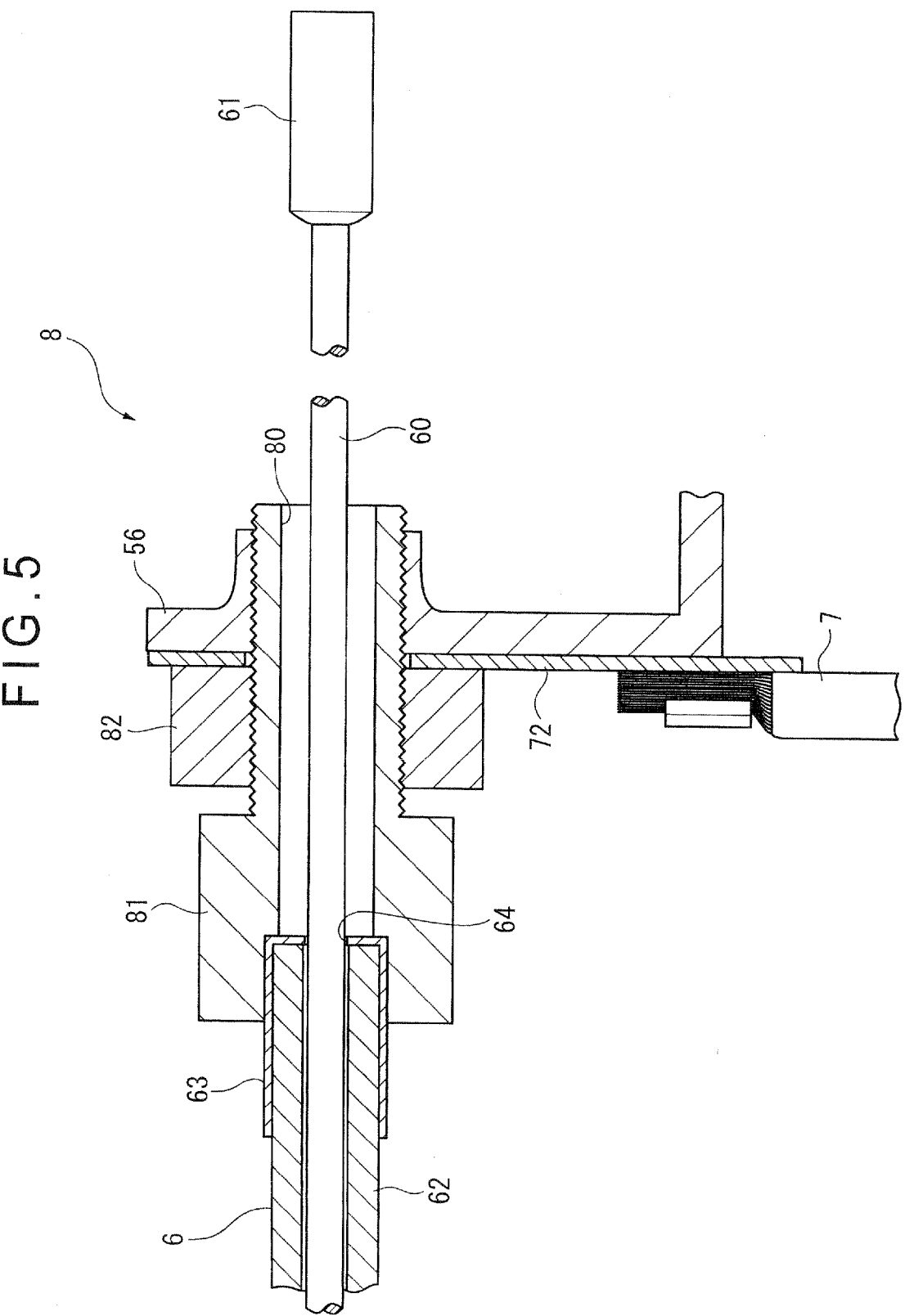
FIG. 5 is a cross sectional view of the throttle adjuster.

FIG. 4 is an exploded perspective view of the throttle adjuster 8, and FIG. 5 is a cross sectional view of the throttle adjuster 8.

The throttle adjuster 8 includes an adjuster bolt 81 into which a metal cap 63 attached to an end of an outer tube 62 for covering the inner wire 60 is inserted, a nut 82 screwed with the adjuster bolt 81, and a flange 56 screwed with the adjuster bolt 81. The flange 56 is a metal plate provided on an upper end of the carburetor 5. The metal cap 63 is provided with an aperture 64 having a (slightly larger) diameter that is approximately equal to that of the inner wire 60. The inner wire 60 is inserted into the aperture 64. The solderless terminal 72 on the second end of the lead wire 7 is penetrated by the adjuster bolt 81, and is attached to the throttle adjuster 8 by being interposed between the nut 82 and the flange 56.

The solderless terminal 72 is in surface contact with the nut 82 and the flange 56 to be conductive therebetween. The nut 82 and the flange 56 are in contact with the adjuster bolt 81 at a screwing portion thereof to be conductive therebetween, and the adjuster bolt 81 is inserted by the metal cap 63 to be conductive therebetween. The metal cap 63 is in contact with the inner wire 60 on a periphery of the aperture 64 to be conductive therebetween. Consequently, the solderless terminal 72 can be favorably connected conductively with the inner wire 60.

This conductive connection eliminates electrical potential difference between the engine 4 and the carburetor 5, and prevents electrostatic discharge between the screw 401 for attaching the insulator 40 to the engine 4 and the nut provided on the insulator 40 without using a grounding chain even when static electricity is generated in the volute case 32 and ventilation tube 35 during cleaning operation or the like. Thus, ignition timing can be prevented from shifting due to influence on an electrical circuit by the discharge within the ignition unit.

It should be noted that, although the best structure, method and the like for carrying out the invention have been described in the above description, the invention is not limited to the above description.

In other words, while the invention has been particularly illustrated and described with reference to the specific embodiment, those skilled in the art can modify the above-described shapes, quantities and other details without departing from the spirit and the scope of the invention.

Thus, a shape, quantity and the like described above merely serve as exemplifying the invention for facilitating an understanding of the invention, and do not serve as any limitations on the invention, so that what is described by a name of a component for which the description of the shape, quantity and the like are partially or totally omitted is also included in the invention.

For example, although the lead wire 7 is attached to the crankcase attachment 44 in the exemplary embodiment, the lead wire 7 may be attached to the crankcase 43 or the cylinder 41 as long as the engine 4 is conductively connected with the metal cap 63.

Although the lead wire 7 is conductively connected with the inner wire 60 via the throttle adjuster 8 in the exemplary embodiment, the lead wire 7 may have an aperture of a diameter that is approximately equal to that of the inner wire 60 and may be directly penetrated by the inner wire 60 through this aperture to be directly connected conductively with the inner wire 60.

Although the carburetor 5 connected to the throttle cable 6 is a rotary valve type in the exemplary embodiment, the carburetor 5 is not limited thereto. The carburetor 5 may be a butterfly type. In addition, the engine 4 is not limited to a stratified scavenging two-cycle engine. The engine 4 may be a two-cycle engine having only the mixture passage 53, or may be a four-cycle engine.

The invention claimed is:

1. An engine blower, comprising:
   a centrifugal blower including a volute case in which a fan is accommodated;
   an engine attached to the centrifugal blower for driving the fan;
   a carburetor mounted to the engine via an insulator; and
   a lead wire which connects the engine and the carburetor to establish conduction between the engine and the carburetor.

2. The engine blower according to claim 1, further comprising:
   a throttle cable, wherein a first end of the throttle cable is connected to a throttle lever of the carburetor and a second end of the throttle cable is operable by an operator to adjust a valve opening degree of the carburetor,
   wherein an inner wire within the throttle cable is in conduction with the lead wire.

* * * * *